US012534837B2

(12) United States Patent
Cox

(10) Patent No.: US 12,534,837 B2
(45) Date of Patent: Jan. 27, 2026

(54) SEWING CELL ADJUSTABLE FEATURE

(71) Applicant: INTEVA PRODUCTS, LLC, Troy, MI (US)

(72) Inventor: Joseph Cox, Shelby Township, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 18/904,343

(22) Filed: Oct. 2, 2024

(65) Prior Publication Data

US 2025/0305197 A1 Oct. 2, 2025

Related U.S. Application Data

(60) Provisional application No. 63/571,770, filed on Mar. 29, 2024.

(51) Int. Cl.
*D05B 19/14* (2006.01)
*D05B 19/16* (2006.01)

(52) U.S. Cl.
CPC ............. *D05B 19/14* (2013.01); *D05B 19/16* (2013.01)

(58) Field of Classification Search
CPC ........ D05D 19/14; D05D 19/12; D05D 57/30; D05D 69/30; D05D 55/14; D05B 19/14; D05B 19/12; D05B 57/30; D05B 69/30; D05B 55/14
See application file for complete search history.

(56) References Cited

U.S. PATENT DOCUMENTS

| 4,762,455 A | * | 8/1988 | Coughlan | ............. B25J 19/023 |
| | | | | 901/8 |
| 4,989,525 A | * | 2/1991 | Portilla | .................. D05B 23/00 |
| | | | | 112/155 |
| 5,095,834 A | * | 3/1992 | Braun | ...................... D05B 3/02 |
| | | | | 112/443 |
| 5,313,897 A | * | 5/1994 | Katamine | ............. D05B 73/00 |
| | | | | 112/470.13 |

(Continued)

FOREIGN PATENT DOCUMENTS

| CN | 118722827 A | * | 10/2024 | ............. D05B 15/00 |
| CN | 119836496 A | * | 4/2025 | ............. D05B 19/12 |
| WO | WO-2023225862 A1 | * | 11/2023 | ............ B25J 19/023 |

OTHER PUBLICATIONS

Office Action (Incorporation by Reference) issued in French Application No. 2503155; Date of Mailing Jul. 18, 2025 (4 pages).

(Continued)

*Primary Examiner* — Danny Worrell
(74) *Attorney, Agent, or Firm* — CANTOR COLBURN LLP

(57) ABSTRACT

A robotic sewing assembly is provided. The robotic sewing assembly includes a fixture to support an article being sewn and a robotic arm. The robotic arm includes a sewing head. The sewing head is configured to apply stitching to the article. The robotic arm is configured to manipulate the sewing head in multiple directions relative to the article. The fixture includes a servo unit to which the article is connected and which is configured to manipulate the article in multiple directions relative to the sewing head. The robotic arm, the sewing head and the servo unit are operable in concert.

13 Claims, 6 Drawing Sheets

(56) References Cited

U.S. PATENT DOCUMENTS

| | | | | | |
|---|---|---|---|---|---|
| 5,381,743 | A | * | 1/1995 | Moll | D05B 23/00 112/470.13 |
| 5,400,730 | A | * | 3/1995 | Moll | D05B 59/04 112/168 |
| 5,875,726 | A | * | 3/1999 | Keilmann | B25J 9/0084 112/475.08 |
| 5,988,085 | A | * | 11/1999 | Martz | D05B 39/00 112/475.08 |
| 7,363,869 | B1 | * | 4/2008 | Yang | D05B 15/02 112/62 |
| 9,512,547 | B2 | * | 12/2016 | Wenzel | D05B 57/04 |
| 10,240,271 | B2 | * | 3/2019 | Freer | D05B 23/00 |
| 10,358,754 | B2 | * | 7/2019 | Sano | B25J 18/04 |
| 10,450,683 | B2 | * | 10/2019 | Hirayama | D05B 35/00 |
| 10,626,535 | B2 | * | 4/2020 | Kadowaki | B25J 15/0019 |
| 10,815,594 | B2 | * | 10/2020 | Goto | D05B 33/00 |
| 11,174,579 | B2 | * | 11/2021 | Ikadai | D05B 69/02 |
| 2017/0028937 | A1 | * | 2/2017 | Sekino | B60N 2/7017 |
| 2025/0043477 | A1 | * | 2/2025 | Dong | B25J 11/005 |

OTHER PUBLICATIONS

Office Action (Lack of Clarity) issued in French Application No. 2503155; Date of Mailing Jul. 18, 2025 (4 pages).

Office Action issued in German Application No. 202025101373; Date of Mailing May 30, 2025 (1 page).

* cited by examiner

SEWING CELL ADJUSTABLE FEATURE

CROSS-REFERENCE TO RELATED APPLICATIONS

This application claims the benefit of U.S. Provisional Application No. 63/571,770 filed Mar. 29, 2024, the disclosure of which is incorporated herein by reference in its entirety.

BACKGROUND

Exemplary embodiments of the present disclosure pertain to the art of robotic sewing assemblies for use in sewing processes.

Robotic sewing technology often includes a sewing head. The sewing head can include an upper arm and a lower arm and can be attached to a robotic arm. The robotic arm positions the sewing head near an article to be sewn. The article, which can be, but is not required to be, an instrument panel (IP) of an automobile for example, is typically held in place by a fixture. The robotic arm orients the sewing head so that a given stitch operation with can be executed with respect to the article.

SUMMARY

According to an aspect of the disclosure, a robotic sewing assembly is provided. The robotic sewing assembly includes a fixture to support an article being sewn and a robotic arm. The robotic arm includes a sewing head. The sewing head is configured to apply stitching to the article. The robotic arm is configured to manipulate the sewing head in multiple directions relative to the article. The fixture includes a servo unit to which the article is connected and which is configured to manipulate the article in multiple directions relative to the sewing head. The robotic arm, the sewing head and the servo unit are operable in concert.

In accordance with additional and/or alternative embodiments, the robotic arm includes a first arm rotatable in at least one direction, a second arm rotatably attached to the first arm to be rotatable in at least one direction and a coupling by which the sewing head is rotatably attached to the second arm to be rotatable in at least two directions.

In accordance with additional and/or alternative embodiments, the sewing head includes a sewing needle and a stitching plate.

In accordance with additional and/or alternative embodiments, the fixture further includes a chassis to which the servo unit is attached and a vertically oriented screen plate supported on the chassis proximate to the servo unit.

In accordance with additional and/or alternative embodiments, the servo unit is configured to manipulate the article in the multiple directions relative to the sewing head during sewing.

In accordance with additional and/or alternative embodiments, the servo unit is configured to rotate and translate the article about and along multiple axes.

In accordance with additional and/or alternative embodiments, the servo unit is configured to rotate the article about a longitudinal axis of the article, to raise and lower the article and to drive the article laterally in first and second transverse directions.

In accordance with additional and/or alternative embodiments, the robotic sewing assembly further includes a programmable controller to control the robotic arm, the sewing head and the servo unit to operate in concert with one another and without operator intervention.

According to an aspect of the disclosure, a robotic sewing assembly is provided for sewing an instrument panel (IP) including an elongate flattened section and an elongate curved section defining vents. The robotic sewing assembly includes a fixture to support the IP and a robotic arm. The robotic arm includes a sewing head. The sewing head is configured to apply stitching to the IP. The robotic arm is configured to manipulate the sewing head in multiple directions relative to the IP. The fixture includes a servo unit to which the IP is connected and which is configured to manipulate the IP in multiple directions relative to the sewing head. The robotic arm, the sewing head and the servo unit are operable in concert to execute sewing on the elongate flattened section and the elongate curved section defining the vents of the IP.

In accordance with additional and/or alternative embodiments, the robotic arm includes a first arm rotatable in at least one direction, a second arm rotatably attached to the first arm to be rotatable in at least one direction and a coupling by which the sewing head is rotatably attached to the second arm to be rotatable in at least two directions.

In accordance with additional and/or alternative embodiments, the sewing head includes a sewing needle and a stitching plate.

In accordance with additional and/or alternative embodiments, the fixture further includes a chassis to which the servo unit is attached and a vertically oriented screen plate supported on the chassis proximate to the servo unit.

In accordance with additional and/or alternative embodiments, the servo unit is configured to manipulate the IP in the multiple directions relative to the sewing head during the sewing.

In accordance with additional and/or alternative embodiments, the servo unit is configured to rotate and translate the IP about and along multiple axes during the sewing.

In accordance with additional and/or alternative embodiments, the servo unit is configured to rotate the IP about a longitudinal axis of the article, to raise and lower the IP and to drive the IP laterally in first and second transverse directions during the sewing.

In accordance with additional and/or alternative embodiments, the sewing is executed along multiple exterior and underside faces of the IP at the elongate flattened section, the elongate curved section and one or more of the vents.

In accordance with additional and/or alternative embodiments, the robotic sewing assembly further includes a programmable controller to control the robotic arm, the sewing head and the servo unit to operate in concert with one another to execute the sewing on the elongate flattened section and the elongate curved section defining the vents of the IP and without operator intervention.

According to an aspect of the disclosure, a method of operating a robotic sewing assembly for sewing an article is provided. The method includes providing a robotic arm including a sewing head and providing a fixture, connecting a servo unit of the fixture to the article and sewing along multiple exterior and underside faces of the article. The sewing includes simultaneously controlling the robotic arm to manipulate the sewing head relative to the article, controlling the sewing head to apply stitching to the article and controlling the servo unit to rotate the article about a longitudinal axis of the article, to raise and lower the article and to drive the article laterally in first and second transverse directions.

In accordance with additional and/or alternative embodiments, the method is executable by a programmable controller without operator intervention.

In accordance with additional and/or alternative embodiments, the article is an instrument panel (IP) of an automobile and includes an elongate flattened section, an elongate curved section and one or more vents and the sewing is executed along multiple exterior and underside faces of the IP at the elongate flattened section, the elongate curved section and the one or more vents.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method are presented herein by way of exemplification and not limitation with reference to the Figures.

In most cases a fixture enables a robotic sewing assembly to have access to a location of a part or article that is being sewn where a stitch is to be applied. However, certain part configurations prevent access to all stitch locations of the part without reaching limitations of the robotic sewing assembly. For example, accessing locations near a top of an instrument panel (IP) and a bottom of the instrument panel (IP) can be difficult in designs in which such access is limited to the top or the bottom.

Thus, as will be described below, a fixture is provided that is capable of adjusting a position and/or oriented of a part or article being sewn with respect to a robotic sewing assembly. This will make completed production of the part or article achievable in a faster and more efficient manner. The part or article is affixed to the fixture and the fixture is capable of controlling the position and/or orientation of the part or article in real-time to allow a sewing head of a robotic sewing assembly to access all sewing locations of the part or article during the sewing process. This gives the sewing head access to those hard to reach places that are found on certain parts or articles with particularly complex geometries. The fixture is capable of moving the part or article in a variety of ways including, but not limited to, rotating the part or article about a given axis and upward, downward or lateral movement of the part or article.

Figure 1:
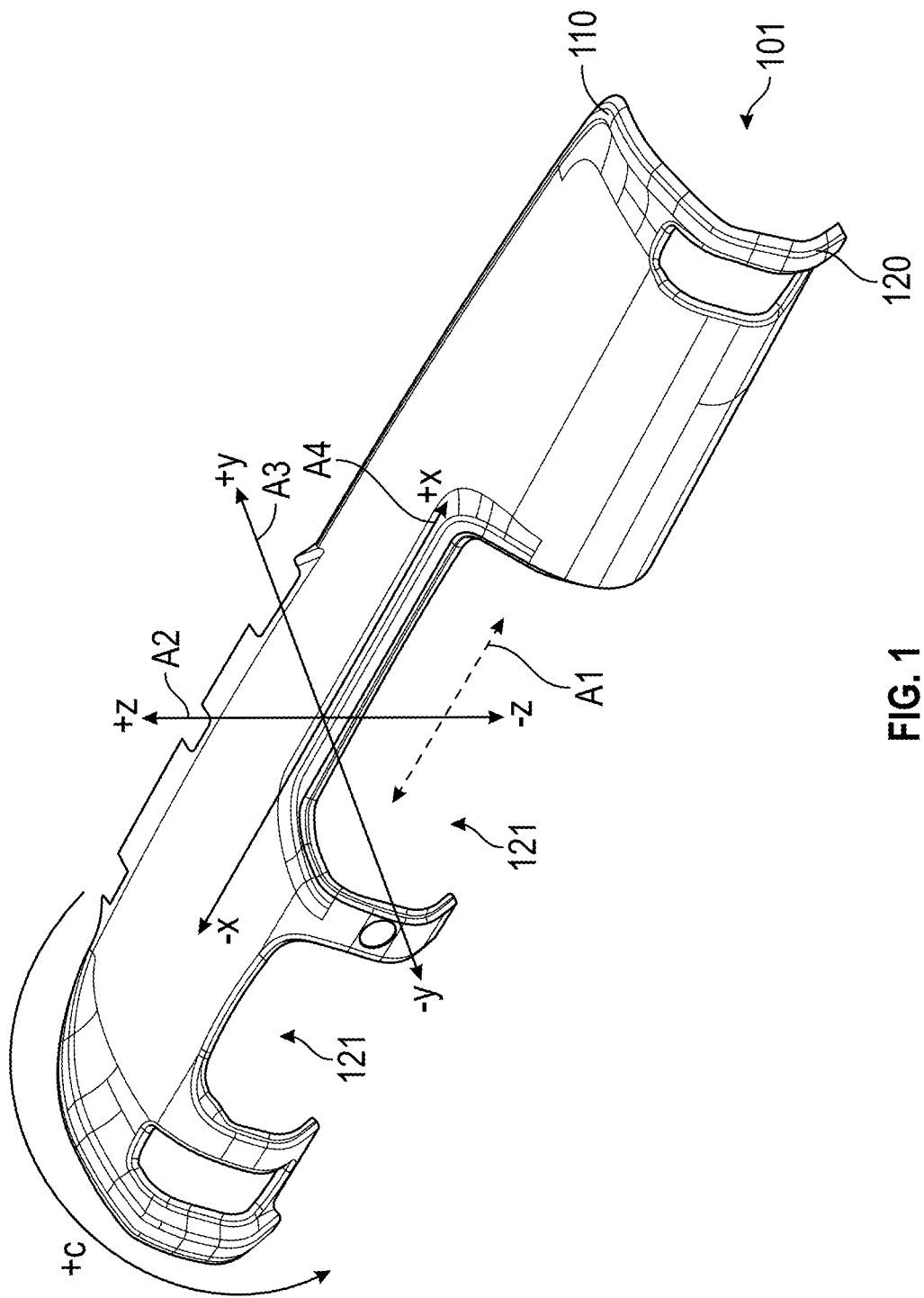
FIG. 1 is a perspective view of an article, such as an instrument panel (IP) of an automobile, to be sewn in accordance with embodiments.
Figure 2A:
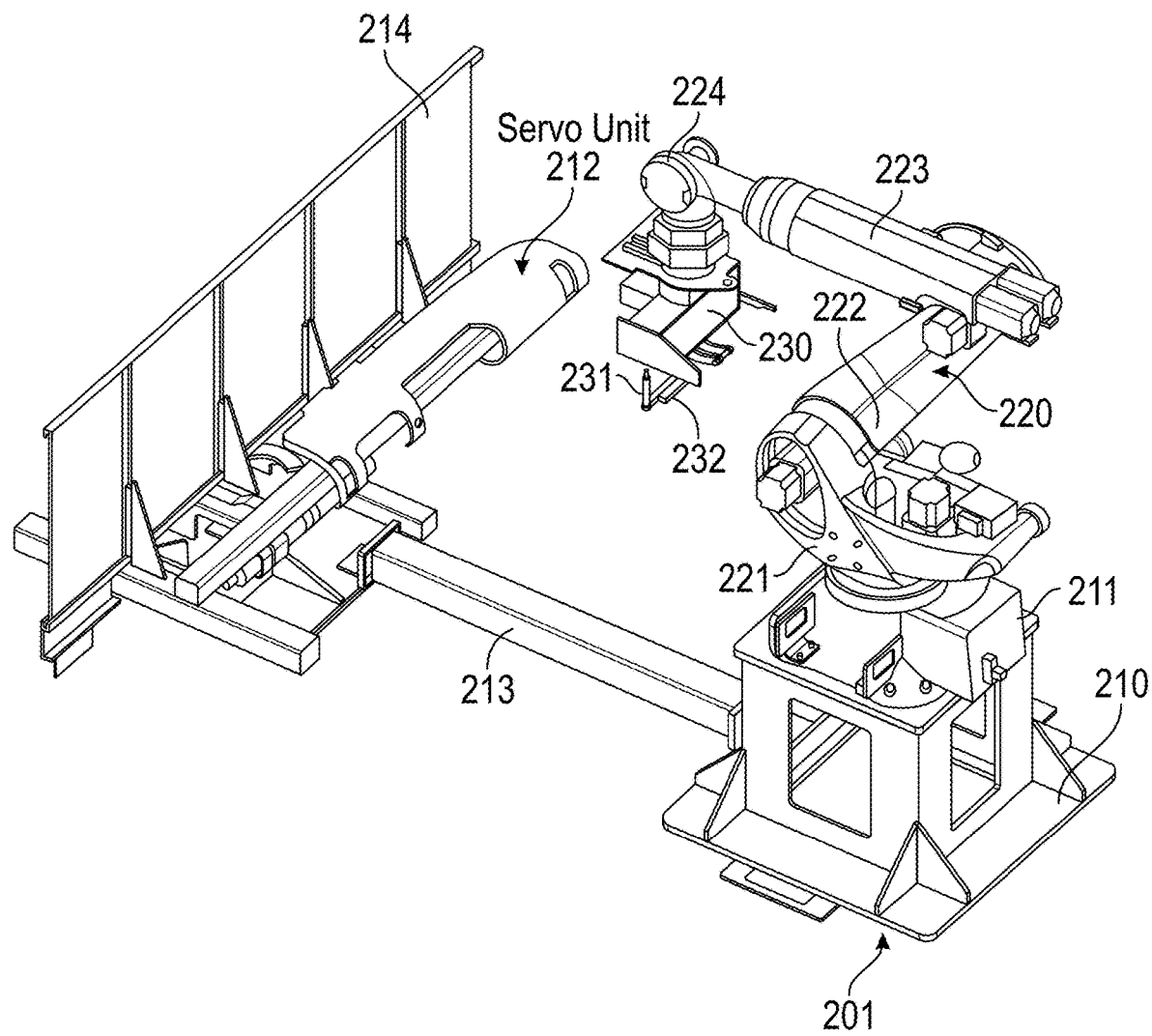
FIGS. 2A and 2B are perspective and side schematic views, respectively, of a robotic sewing assembly to execute the sewing of the article of FIG. 1 in accordance with embodiments.
Figure 2B:
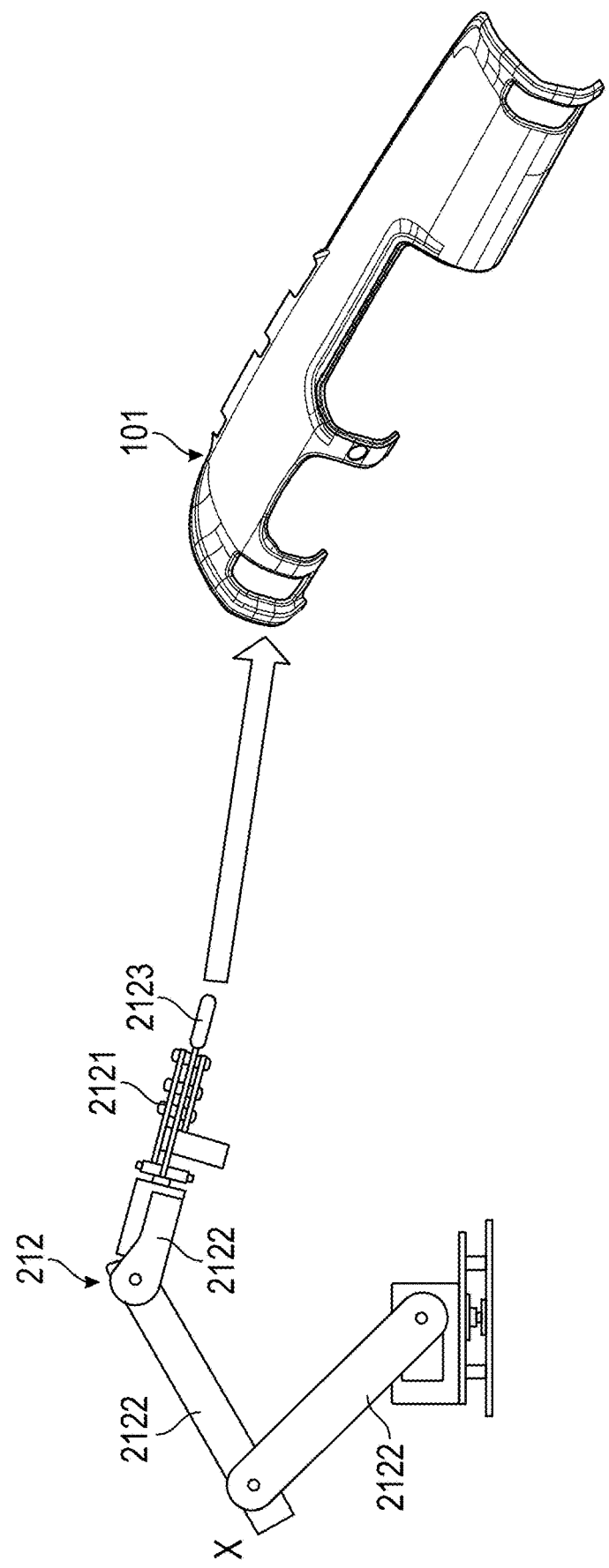

With reference to FIG. 1 and FIGS. 2A and 2B, a robotic sewing assembly 201 is provided for sewing an article, such as an IP 101 for an automobile, is provided (for purposes of clarity and brevity, the following description will generally refer to the IP 101, but it is to be understood that this terminology is and would be interchangeable with the "article"). The IP includes an elongate flattened section 110 and an elongate curved section 120 that is formed to define one or more vents 121. The sewing of the IP 101 adds stitching to multiple exterior and underside faces of the IP 101 at the elongate flattened section 110, at the elongate curved section 120 and at edges of one or more of the vents 121.

The robotic sewing assembly 201 includes a fixture 210 to rotatably and movably support the IP 101 and a robotic arm 220. The robotic arm 220 includes a sewing head 230. The sewing head 230 is configured to apply the stitching to the multiple exterior and underside faces of the IP 101 at the elongate flattened section 110, at the elongate curved section 120 and at edges of one or more of the vents 121. The robotic arm 220 is configured to manipulate the sewing head 230 in multiple directions relative to the IP 101. The fixture 210 includes an optional base portion 211 on which the robotic arm 220 can be anchored (though it is to be understood that, in a robotic gantry system for example or in other similar cases, no anchoring is needed or provided) and a servo unit 212 to which the IP 101 is connected. The servo unit 212 is configured to manipulate the IP 101 in multiple directions relative to the sewing head 230. The robotic arm 220, the sewing head 230 and the servo unit 212 are operable in concert with one another to execute the sewing on the IP 101.

The servo unit 212 can include a gripping portion 2121 that is configured to grip the IP 101 without interfering with sewing operations and multiple servo arms 2122 that are movable and rotatable relative to the IP 101 and relative to one another. The gripping portion 2121 includes grippers 2123 that can grip any portion of the IP 101 and can be rotatable relative to the proximal one of the multiple servo arms 2122. The servo unit 212 is thus capable of moving and/or rotating the IP 101 in and about multiple directions and axes. That is, the servo unit 212 can move the IP 101 upwardly and downwardly, forwardly and reversely, side-to-side and/or about any vertical or horizontal axis.

The sewing head 230 includes a sewing needle 231 and a stitching plate 232. The robotic arm 220 includes the sewing head 230, an optional base 221 that can be anchored to the base portion 211 of the fixture 210 (as noted above, in the case of a robotic gantry system for example or in other similar cases, the optional base 221 is not present and no anchoring is needed or provided), a first arm 222 that is rotatable in at least one direction, a second arm 223 that is rotatably attached to the first arm 222 to be rotatable in at least one direction and a coupling 224 by which the sewing head 230 is rotatably attached to the second arm 223 to be rotatable in at least two directions. The fixture 210 includes the optional base portion 211, the servo unit 212 and further includes a chassis 213 to which the optional base portion 211 and the servo unit 212 are attached at a distance from one another and a vertically oriented screen 214 that is supported on the chassis 213 proximate to the servo unit 212.

The servo unit 212 is configured to manipulate the IP 101 in the multiple directions relative to the sewing head 230 during the sewing. More particularly, the servo unit 212 is configured to rotate and translate the IP 101 about and along multiple axes during the sewing. That is, the servo unit 212 is configured to rotate the IP 101 about a longitudinal axis A1 of the IP 101, to raise and lower the IP 101 along a vertical axis A2 and to drive the IP laterally in first and second transverse directions along lateral directions A3 and A4 during the sewing. Thus, as will be further discussed below, the sewing can be executed along multiple exterior and underside faces of the IP 101 at the elongate flattened section 110, the elongate curved section 120 and one or more of the vents 121.

Figure 3:
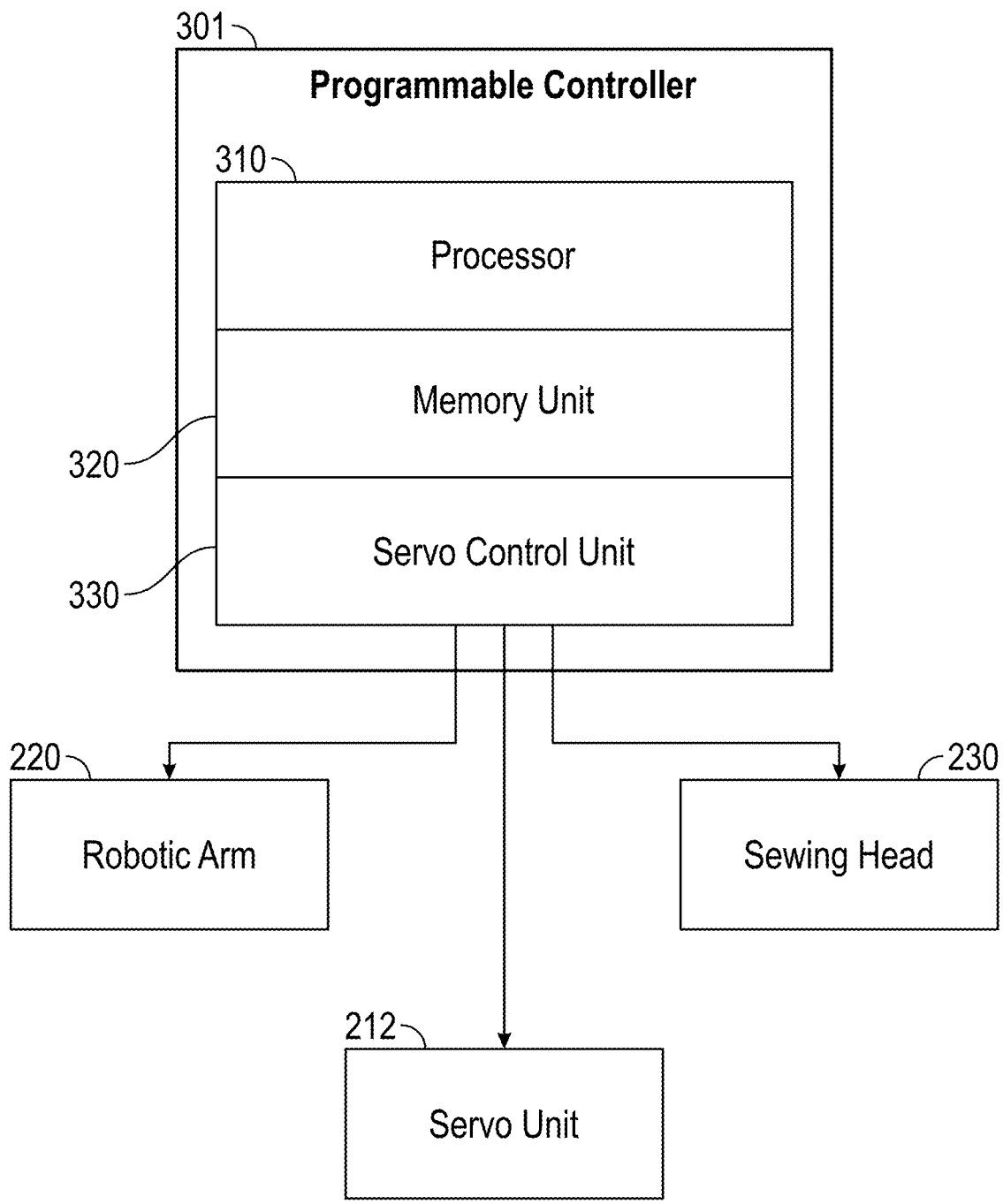
FIG. 3 is a schematic diagram of a programmable controller of the robotic sewing assembly of FIGS. 2A and 2B in accordance with embodiments.

With continued reference to FIG. 1 and FIGS. 2A and 2B and with additional reference to FIG. 3, the robotic sewing assembly 201 can further include a programmable controller 301. The programmable controller 301 can include a processor 310, a memory unit 320 and a servo control unit 330 that is disposed in signal communication with the robotic arm 220, the sewing head 230 and the servo unit 212. The memory unit 320 has executable instructions stored thereon that are readable and executable by the processor 310. When the executable instructions are read and executed by the processor 310, the processor 310 effectively controls the robotic arm 220, the sewing head 230 and the servo unit 212 via the servo control unit 330 to operate in concert with one another to execute the sewing on the IP 101 and without operator intervention.

Figure 4:
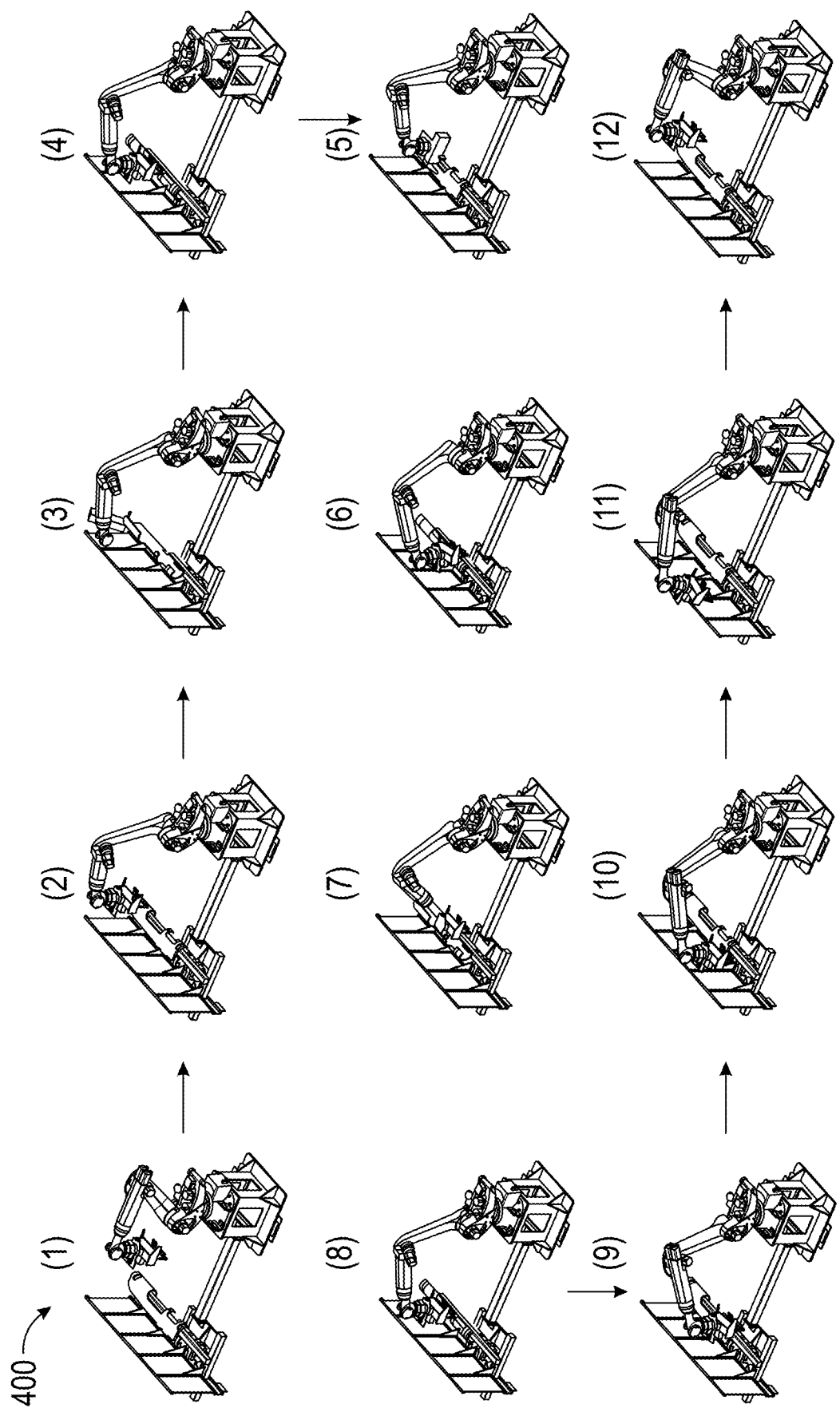
FIG. 4 is a graphical illustration of a sequence of operations of the robotic sewing assembly of FIGS. 2A and 2B in accordance with embodiments.

With continued reference to FIGS. 1-3 and with additional reference to FIG. 4, a sequence 400 of the operations of the robotic arm 220, the sewing head 230 and the servo unit 212 is shown. As shown in images (1) and (2) of FIG. 4, the robotic arm 220 initially extends the sewing head 230 toward and over the IP 101 while rotating the sewing head 230 slightly. As shown in images (3), (4) and (5) of FIG. 4, the rotation of the sewing head 230 continues and the servo unit 212 begins to rotate the IP 101 counter-clockwise such that an underside face of the IP 101 faces the sewing head 230. As shown in images (4) and (5) of FIG. 4, the robotic arm 220 then rotates the sewing head 230 downwardly and curvilinearly toward the IP 101 while the servo unit 212 rotates the IP 101 clockwise such that an edge of the IP 101 at a vent 121 is brought between the sewing needle 231 and the stitching plate 232. At this point, as shown in images (6), (7), (8) and (9) of FIG. 4, the robotic arm 220 drives the sewing head 230 laterally while the servo unit rotates the IP 101 counter-clockwise so that the sewing head can apply stitching to the edge of the IP 101 at the vent 121. As shown in images (10) and (11) of FIG. 4, the robotic arm 220 then rotates the sewing head about the IP 101 to allow the sewing head to continue applying the stitching to the IP 101. As shown in image (12) of FIG. 4, this process continues until the sewing is complete whereupon the robotic arm 220 beings to pull the sewing head 230 away from the IP 101.

Figure 5:
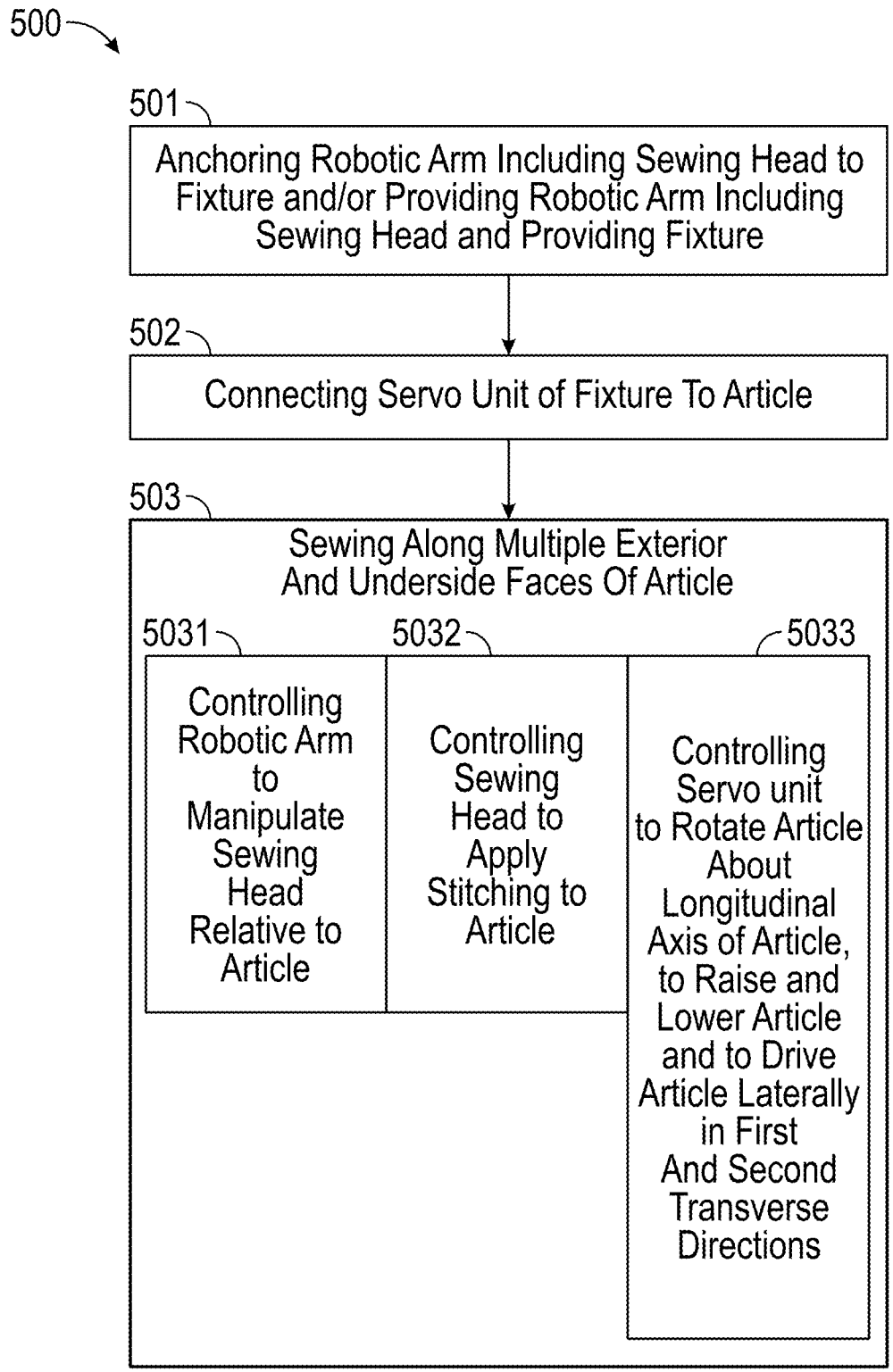
FIG. 5 is a flow diagram illustrating a method of operating a robotic sewing assembly for sewing an article, such as an instrument panel (IP) of an automobile, in accordance with embodiments.

With reference to FIG. 5, a method 500 of operating a robotic sewing assembly for sewing an article, such as an instrument panel (IP), generally as described above with reference to FIGS. 1-4, is provided. The method 500 is executable by a programmable controller without operator intervention. As shown in FIG. 5, the method 500 includes optionally anchoring a robotic arm including a sewing head to a base portion of a fixture and/or providing the robotic arm including the sewing head and providing the fixture (block 501), connecting a servo unit of the fixture to the IP (block 502) and sewing along multiple exterior and underside faces of the IP (block 503). The sewing of block 503 includes simultaneously controlling the robotic arm to manipulate the sewing head relative to the IP (block 5031), controlling the sewing head to apply stitching to the IP (block 5032) and controlling the servo unit to rotate the IP about a longitudinal axis of the IP, to raise and lower the IP and to drive the IP laterally in first and second transverse directions (block 5033). As such, where the IP includes an elongate flattened section, an elongate curved section and one or more vents, the sewing of block 503 can be executed along multiple exterior and underside faces of the IP at least at the elongate flattened section, the elongate curved section and the one or more vents.

Technical effects and benefits of the present disclosure are the provision of a fixture for a robotic sewing assembly that is capable of adjusting a position and/or oriented of a part or article being sewn with respect to a sewing head of the robotic sewing assembly. This will make completed production of the part or article achievable in a faster and more efficient manner The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A robotic sewing assembly, comprising:
   an instrument panel (IP) to be sewn, the IP being elongate along a longitudinal axis and comprising an elongate flattened section, which is elongate along the longitudinal axis, and an elongate curved section, which is elongate along and curved about the longitudinal axis;
   a fixture to support the IP; and
   a robotic arm comprising a sewing head, the sewing head being configured to apply stitching to the IP and the robotic arm being configured to manipulate the sewing head in multiple directions relative to the IP,
   the fixture comprising a servo unit to which the IP is connected and which is configured to manipulate the IP in at least a rotational direction defined about the longitudinal axis, a vertical direction perpendicular to the longitudinal axis and a translational axis defined along the longitudinal axis relative to the sewing head, and the robotic arm, the sewing head and the servo unit being operable in concert.

2. The robotic sewing assembly according to claim 1, wherein the robotic arm comprises:

a first arm rotatable in at least one direction;

a second arm rotatably attached to the first arm to be rotatable in at least one direction; and a coupling by which the sewing head is rotatably attached to the second arm to be rotatable in at least two directions.

3. The robotic sewing assembly according to claim 1, wherein the elongate curved section is formed to define one or more vents and the sewing head comprises a sewing needle and a stitching plate and is configured to add stitching to multiple exterior and underside faces of the IP at the elongate flattened section, at the elongate curved section and at edges of the one or more of the vents.

4. The robotic sewing assembly according to claim 1, wherein the fixture further comprises:

a chassis to which the servo unit is attached; and a vertically oriented screen plate supported on the chassis proximate to the servo unit.

5. The robotic sewing assembly according to claim 1, further comprising a programmable controller to control the robotic arm, the sewing head and the servo unit to operate in concert with one another and without operator intervention.

6. A robotic sewing assembly, comprising:

an instrument panel (IP) to be sewn, the IP being elongate along a longitudinal axis and comprising an elongate flattened section, which is elongate along the longitudinal axis, and an elongate curved section defining vents which is elongate along and curved about the longitudinal axis;

a fixture to support the IP; and a robotic arm comprising a sewing head, the sewing head being configured to apply stitching to the IP and the robotic arm being configured to manipulate the sewing head in multiple directions relative to the IP, the fixture comprising a servo unit to which the IP is connected and which is configured to manipulate the IP in at least a rotational direction defined about the longitudinal axis, a vertical direction perpendicular to the longitudinal axis and a translational axis defined along the longitudinal axis relative to the sewing head, and the robotic arm, the sewing head and the servo unit being operable in concert to execute sewing on the elongate flattened section and the elongate curved section defining the vents of the IP.

7. The robotic sewing assembly according to claim 6, wherein the robotic arm comprises:

a first arm rotatable in at least one direction;

a second arm rotatably attached to the first arm to be rotatable in at least one direction; and a coupling by which the sewing head is rotatably attached to the second arm to be rotatable in at least two directions.

8. The robotic sewing assembly according to claim 6, wherein the sewing head comprises a sewing needle and a stitching plate and is configured to add stitching to multiple exterior and underside faces of the IP at the elongate flattened section, at the elongate curved section and at edges of the one or more of the vents.

9. The robotic sewing assembly according to claim 6, wherein the fixture further comprises:

a chassis to which the servo unit is attached; and a vertically oriented screen plate supported on the chassis proximate to the servo unit.

10. The robotic sewing assembly according to claim 6, further comprising a programmable controller to control the robotic arm, the sewing head and the servo unit to operate in concert with one another to execute the sewing on the elongate flattened section and the elongate curved section defining the vents of the IP and without operator intervention.

11. A method of operating a robotic sewing assembly for sewing an article, the method comprising:

providing the article as an instrument panel (IP) to be sewn, the IP being elongate along a longitudinal axis and comprising an elongate flattened section, which is elongate along the longitudinal axis, and an elongate curved section, which is elongate along and curved about the longitudinal axis;

providing a robotic arm comprising a sewing head and providing a fixture;

connecting a servo unit of the fixture to the IP; and sewing along multiple exterior and underside faces of the IP, the sewing comprising simultaneously:

controlling the robotic arm to manipulate the sewing head relative to the IP;

controlling the sewing head to apply stitching to the IP; and controlling the servo unit to rotate the IP about the longitudinal axis, to raise and lower the IP and to drive the IP laterally in first and second transverse directions.

12. The method according to claim 11, wherein the method is executable by a programmable controller without operator intervention.

13. The method according to claim 11, wherein:

the IP is an IP of an automobile and the elongate curved section defines one or more vents, and the sewing is executed along multiple exterior and underside faces of the IP at the elongate flattened section, the elongate curved section and the one or more vents.

* * * * *